United States Patent [19]

Rosen

[11] Patent Number: 5,327,321
[45] Date of Patent: Jul. 5, 1994

[54] PROTECTIVE SHUTTER ASSEMBLY FOR ELECTRICAL TERMINALS AND METHOD OF USING SAME

[76] Inventor: Gary M. Rosen, 121 Evergreen Dr., Clemson, S.C. 29631

[21] Appl. No.: 23,039

[22] Filed: Feb. 25, 1993

[51] Int. Cl.$^5$ .............................................. H02B 1/14
[52] U.S. Cl. .............................. 361/617; 200/50 AA
[58] Field of Search ................................ 200/50 AA; 361/336–339, 345

[56] References Cited

U.S. PATENT DOCUMENTS 4,351,990  9/1982  Hesselbart et al. ............... 361/336

FOREIGN PATENT DOCUMENTS 665562  10/1965  Belgium ....................... 200/50 AA
0068835  6/1978  Japan .............................. 361/345
0574805  9/1977  U.S.S.R. .......................... 361/345

Primary Examiner—Gregory D. Thompson
Attorney, Agent, or Firm—Larry I. Golden; Kareem M. Irfan

[57] ABSTRACT

The present invention provides a shutter assembly for covering an exposed electrical terminal located in a control center into which removably inserts an electrical control device connecting to the terminal. The assembly includes a shutter to cover the exposed terminal when superposed thereover. The shutter has a pivotal axis at one end, so that the opposite end of the shutter pivots away from the exposed terminal and swings clear of the control device to provide access to the terminal. The rotation of the shutter is automatically controlled to expose the terminal when the control device is inserted in the cell and reversibly pivots the shutter to cover the terminal upon removing the control device from the cell. The present invention also provides a method of safely protecting an exposed terminal mounted in a control center. A control center is provided with a partially enclosed framework for removably inserting a control device. Subsequently, a self-contained shutter assembly is installed for supporting a shutter in a superposed relation over the exposed terminals and for controlling the rotation of the shutter to expose the terminal when the control device is inserted in the cell and reversibly pivots the shutter to cover the terminal upon removing the control device from the cell.

10 Claims, 3 Drawing Sheets

PROTECTIVE SHUTTER ASSEMBLY FOR ELECTRICAL TERMINALS AND METHOD OF USING SAME

FIELD OF THE INVENTION

The present invention relates to control centers for distributing and controlling electrical service which have exposed electrical terminals and, more particularly, to a shutter assembly which protects the exposed terminals preventing accidental contact when an individual control device is removed therefrom.

BACKGROUND OF THE INVENTION

Motor control centers, as well as other electrical equipment like switchgear, are equipped with draw-out type protective control devices such as fusible disconnect switches or circuit breakers. These control devices are inserted into individual cells or compartments within the center to establish mechanical and electrical contact with bus bars, load and line stabs, or similar electrical terminals. Where there are several control devices stacked together or otherwise arranged, the terminals usually remain energized when any one of the individual control devices is removed.

The exposed terminals pose a safety hazard. An operator could be severely burned or shocked if the terminals were accidentally touched while servicing the center or installing other components near the terminals. Therefore, when a control device is removed, it is desirable to close off access to the exposed terminals to prevent inadvertent contact with the energized terminals.

There are several prior art shutter arrangements which are mounted to the rear portion of the individual cells in a control center. When the control device is inserted into the cell, shutters slide to different areas to expose the terminals for connection with the control device. The sliding mechanism supporting the shutters is complex and bulky, requiring an intricate interaction with the control device during the insertion procedure for the shutters to open properly. The sliding shutters and accompanying support mechanism occupy a substantial amount of space in the rear portion of the cell. Thus, other components and features of the center are prevented from using this area.

There is a need for a space-saving shutter using an inexpensive, simple assembly which does not interfere with the other components or operation of the control center and the respective control devices. In view of increasing safety requirements for control centers already in operation that do not contain protective apparatus for exposed terminals, there is also a need for a field-installed protective shutter assembly that fits the control center designs of various manufacture.

SUMMARY OF THE INVENTION

In accordance with the present invention, a shutter assembly is provided for covering an exposed electrical terminal located in a control center having at least one cell which receives an electrical control device connecting to the terminal. The assembly includes a shutter having sufficient size to substantially cover the exposed terminal when superposed thereover. The shutter has a pivotal axis at one end, so that the opposite end of the shutter pivots away from the exposed terminal and swings clear of the control device to provide access to the terminal. The assembly includes means for controlling the rotation of the shutter on the pivotal axis so that the control means automatically pivots the shutter to expose the terminal when the control device is inserted in the cell and reversibly pivots the shutter to cover the terminal upon removing the control device from the cell. The control means is connected to the pivotal axis of the shutter. The assembly also includes means for supporting the shutter in a superposed relation to the terminal and fastening the control means to the center.

The present invention also contemplates providing a center for controlling electrical service with at least one control device. The center includes a partially enclosed framework and at least one cell defined in the framework for receiving the control device. The center also includes a plurality of terminals extending from a rear portion of each cell for mating with a corresponding plurality of terminal receivers extending from a teat portion of the control device. The center further includes a shutter assembly as described above.

The present invention also provides a method of safely protecting an exposed terminal mounted in a control center. A control center is provided with a partially enclosed framework and at least one cell defined in the framework for receiving a control device. The control center has a plurality of terminals extending from the portion of the framework in each cell for mating with a corresponding plurality of terminal receivers extending from a rear portion of the control device. Subsequently, a self-contained shutter assembly, as described above, is installed for supporting a shutter in a superposed relation over the exposed terminals and for controlling the rotation of the shutter to expose the terminal when the control device is inserted in the cell and reversibly pivots the shutter to cover the terminal upon removing the control device from the cell.

Accordingly, an object of the present invention is to provide a shutter assembly which automatically protects exposed terminals in a control center when the individual control devices have been removed.

Another object of the invention is to provide a shutter assembly which can be used with control centers which are already operating in the field.

A further object of the present invention is to provide a shutter assembly which is self-contained, easily mounted and saves space in the protected area.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure.

DETAILED DESCRIPTION

Figure 1:
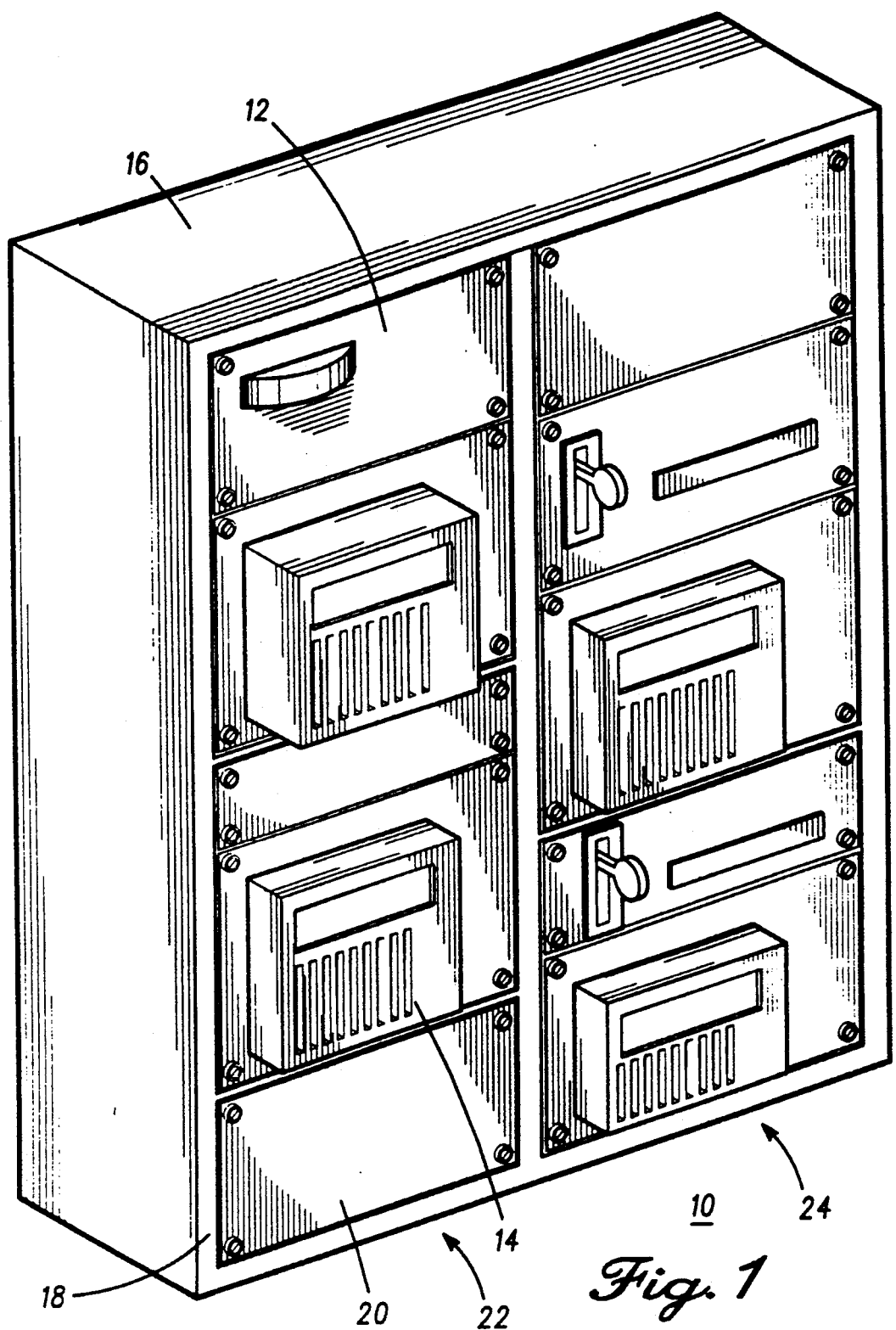
FIG. 1 is a perspective view of a control center embodying the present invention.

Referring now to the drawings there is illustrated a control center embodying the present invention. In FIG. 1 the control center 10 is defined with a plurality of individual cells occupied by different control devices shown typically by reference numerals 12 and 34. The control devices like 12 are removably accommodated in the respective individual cells. The control devices 12, 14 are typically similar in mechanical structure to one another although they may have different dimensions and include different electrical components.

A covered framework, generally designated as 16, partially encloses each control device leaving the front 18 of the framework open to insert the control devices 12, 14 therethrough. If the control center 10 is to operate for a long time period without a control device mounted in a particular cell, a cover panel 20 is placed over the opening in the front 18 of the framework while it is in operation.

The control center 10 also illustrates using the present invention with a variety of cell arrangements. The stacked configuration of individual cells in a first column 22 can be repeated any number of times as exemplified with a second column 24 of stacked individual cells.

Figure 2:
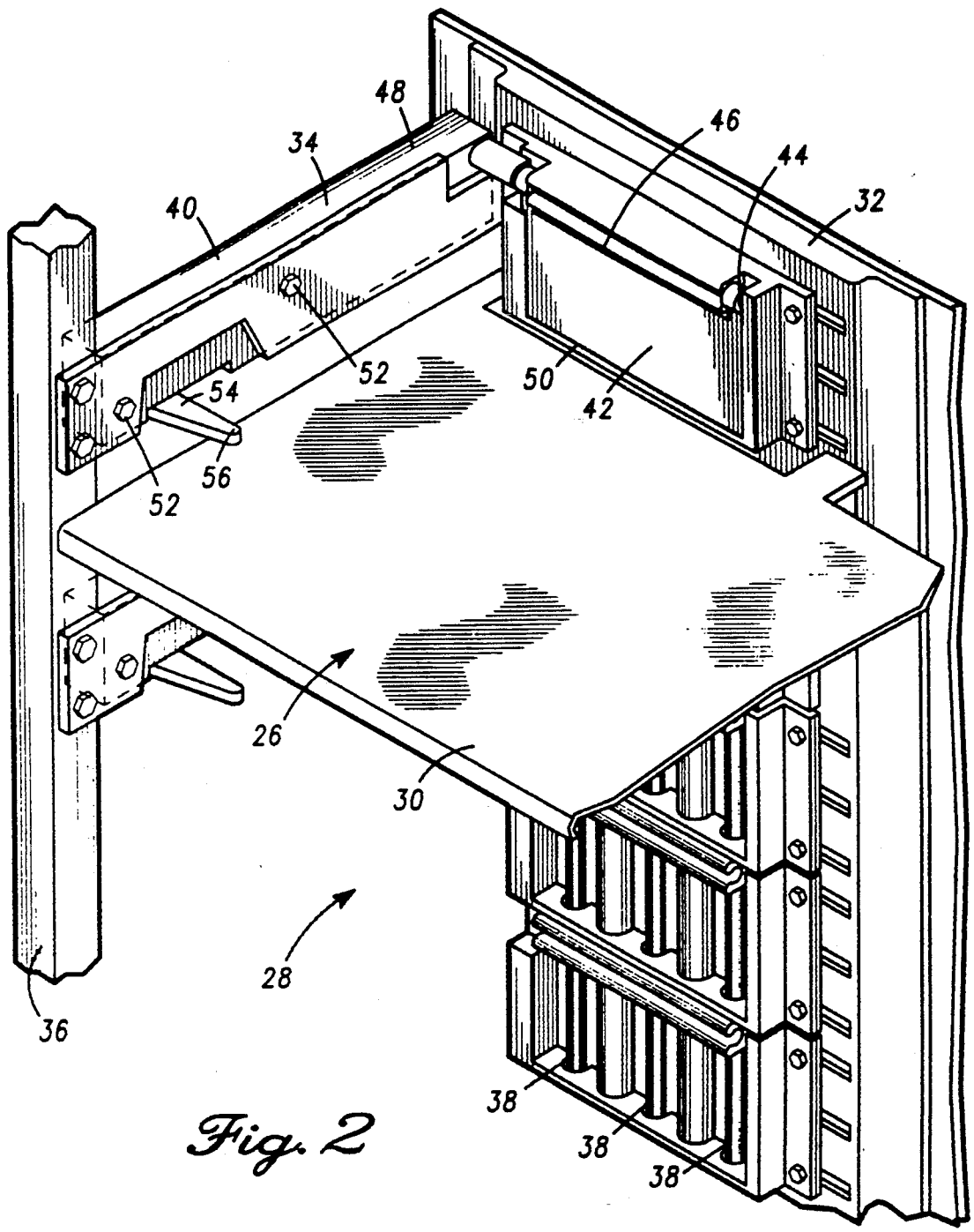
FIG. 2 is a partial perspective view of several individual cells of a control center as illustrated in FIG. 1 with attached shutter assemblies of the present invention.

Referring now to FIG. 2, there are a plurality of individual cells 26, 28 in a stacked configuration. The cells 26, 28 are separated by a barrier like the horizontal shelf 30. Each cell 26 is defined by a rear portion 32, a side portion 34, and a front portion 36 of the framework comprising the control center 10.

Mounted to the rear portion 32 of the framework are electrical terminals 38, in particular, bus bars, for the load and line connections of a multiphase circuit. The terminals 38 are accessible in each individual cell 26, 28. The terminals 38 are positioned to mechanically and electrically connect with corresponding terminals on the control device. The framework 16 typically provides the alignment necessary to complete the connection with the terminals 38 as the control device is inserted into the cell 26.

When the control device is removed from the individual cell 26, the terminals 38 become exposed to inadvertent contact with an operator or their tools. To protect the exposed terminals 38, a preferred embodiment of the inventive shutter assembly 40 is mounted to the side portion 34 of the framework. A shutter 42 is provided in a superposed relation over the terminals 38. The shutter 42 has a generally planar shape and is of sufficient size to substantially cover the area of the otherwise exposed terminals 38.

The shutter 42 has a pivotal axis 44 extending along its top end 46. The shutter 42 is supported in superposed position relative to the terminals 38 by a housing generally designated as 48. The shutter 42 is rotatably mounted to the housing 48 so that the opposite or bottom end 50 of the shutter pivots in an upward direction along the pivotal axis 44. The housing 48 is attached to the side portion 34 of the framework with fasteners like screws 52.

The housing 48 also supports a lever 54 which has one end 56 extending into the area of the cell 26. The lever 54 is rotatably mounted to the housing 48 so that the lever end 56 rotates towards the housing 48. When the control device is inserted into the cell 26 at the front portion 36 of the framework, the rear corner of the control device engages the lever end 56. As the control device moves rearwardly, the lever end 56 abuts the side of the control device and eventually rotates flush with the side portion 34 of the framework and the housing 48.

The lever 54 is connected to the shutter 42 and the position of the lever end 56 controls the opening and closing of the shutter 42. As the lever end 56 moves toward the flush position, the shutter 42 rotates along the pivotal axis 44. The bottom end 50 of the shutter pivots away from the rear portion 32 of the framework to provide access to the terminals 38 and clear the approaching rear face of the control device.

As the control device is removed from the cell 26, the lever end 56 returns to its original position, extending into the vacant area of the cell 26. As the lever end 56 moves to this position, the shutter 42 rotates along the pivotal axis 44 to pivot the bottom end 50 of the shutter downwardly and cover the exposed terminals 38.

Figure 3:
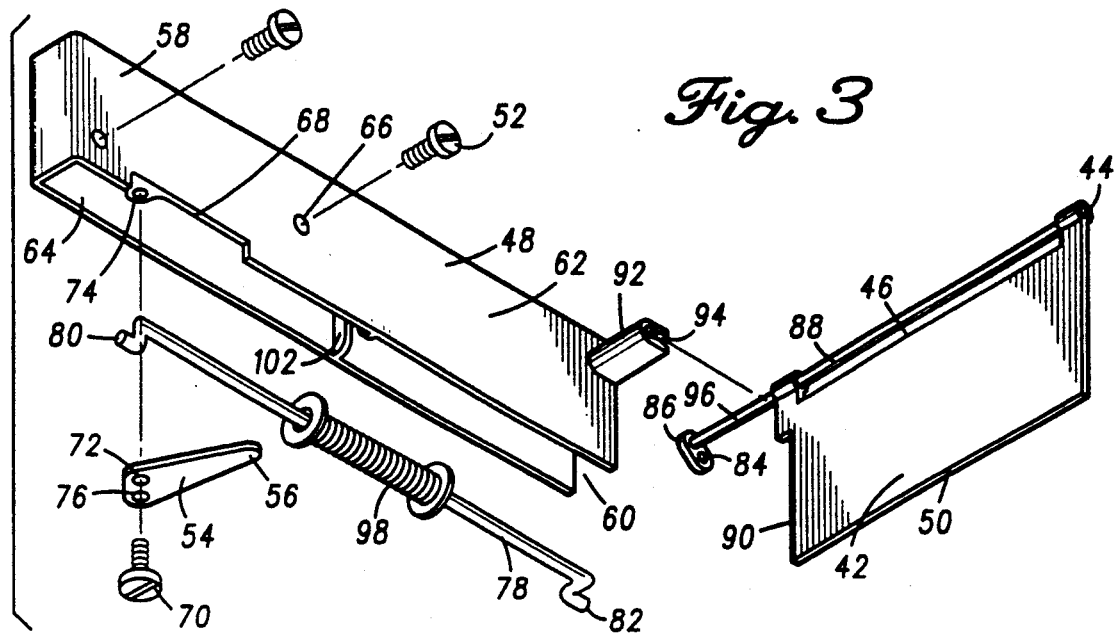
FIG. 3 is an isolated, exploded perspective view of a shutter assembly embodiment of the present invention.

Referring now to FIG. 3, a preferred configuration for the housing 48 is illustrated. A U-shaped channel 58 is provided with a bight portion 60 defined by two upstanding side walls 62, 64. One of the side walls 62 has a plurality of holes 66 to accommodate screws 52 and attach the channel 58 to the side portion 34 of the framework as previously described. Other means for attaching the housing 48 to the framework 16 is contemplated by the present invention. Bolts, clips, other mechanical fasteners, adhesives, even wielding, are suitable for use in attaching the housing 48 to the framework 16.

The lever 54 is rotatably mounted to the top edge 68 of the channel side wall. A fastener, like screw 70, is provided through a hole 72 in the lever and into an accommodating hole 74 located in the top edge 68. The area surrounding the top edge hole 74 is reinforced to support the rotation of the lever 54 around this point. The lever end 56 extends into the area of the cell. The opposite end of the lever 54 provides a hole 76 for connection with the shutter 42.

A link 78 is provided for rotatably connecting one end 80 with the opposite lever end hole 76. The opposite end 82 of the link rotatably connects with a hole 84 in a cam 86. The link 78 is positioned within the bight portion 60 of the channel.

A rod 88 is affixed to the shutter 42 along the pivotal axis 44 at the top end 46 of the shutter. The rod 88 extends beyond the side edge 90 of the shutter to affix to end of the cam 86 opposite the cam hole 84.

A second channel 92 is connected at one end of the channel side wall 62. The second channel 92 extends perpendicularly from the channel side wall 62 into the area of the cell. The second channel 92 similarly includes a bight portion 94 defined by two upstanding side walls. The width of the bight portion 94 is sized rotatably mount the diameter of the rod 88. The second channel side walls defining the bight portion 94 resiliently separate to accommodate the snap insertion of the rod 88 therebetween. A section 96 of the rod between the cam 86 and the side edge 90 of the shutter is extended to rotatably mount within the length of the second channel 92. The end of the channel 58 is open to accommodate the insertion of the cam 86 as the rod 88 is mounted to the second channel 92.

Figure 5:
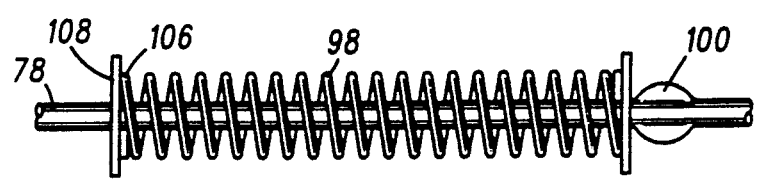
FIG. 5 is an isolated side view of a link mounted spring from the shutter assembly illustrated in FIG. 3.

A spring 98 connected to the link 78 provides an energy means for returning the shutter 42 to the closed position when the control device is removed from the cell. The spring 98 is mounted to the link 78 between a crimp 100 in the link, best illustrated in FIG. 5, and a retaining wall 102.

Figure 4:
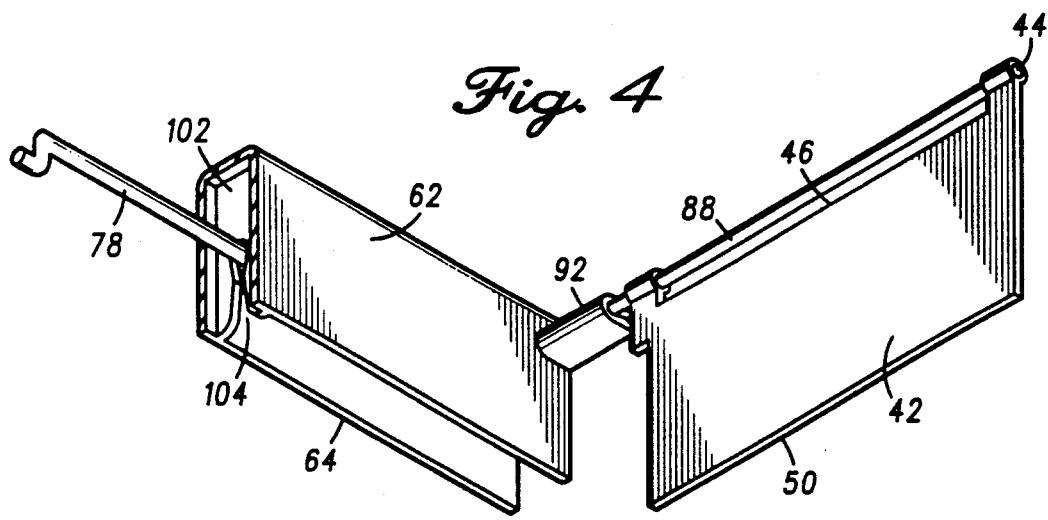
FIG. 4 is an partial perspective view of an assembled shutter assembly illustrated in FIG. 3 with a portion of the housing cut-away.

FIG. 4 more clearly illustrates the retaining wall 102 extending perpendicularly across the bight portion 60 of the channel. The retaining wall 102 contains an aperture 104 therethrough which accommodates the link 78. The end 105 of the spring 98 opposite the crimp 100 is fitted with a washer 108 which rests against one face of the retaining wall. Thus, the spring is held in position between the retaining wall 102 and the crimp 100.

In the operation of the shutter assembly 40, when the control device has been removed from the cell and it is empty, the lever end 56 extends into the area of the cell 26. In this lever end 56 position, the shutter 42 is in a superposed relation to the terminals 38. As the control device is inserted into the cell 26, the rear face or corner of the device contacts or engages the lever end 56 and pushes it rearwardly. The lever 54 pivots around the mounting screw 70 and pulls on the link 78.

As the link 78 is being pulled by the lever hole 76, the crimp 100 in the link moves toward the retaining wall 102 and compresses the spring 98 therebetween. Simultaneously, the opposite end 82 of the link pulls on the cam hole 84 to rotate the cam 86 clockwise as viewed in FIG. 3. Since the rod 88 is affixed to the cam 86, the rod 88 rotates in the second channel 92. Consequently, the shutter 42 rotates about the pivotal axis 44 along the top end 46. The bottom end 50 of the shutter swings away from the terminals 38. The bottom end 50 of the shutter rotates sufficiently to clear the rear face of the control device as it connects mechanically and electrically with the terminals 38.

When the control device is disconnected from the terminals 38 and removed from the cell 26, the opposite procedure described above occurs. The compressed spring 98 provides a force which pulls the link 78 rotatably mounted in the lever hole 72 to rotate the lever end 56 back into the area of the cell 26 vacated by the removal of the control device. As a consequence of the link 76 and lever 54 returning to their original position, the cam 86 rotates the rod 88 and swings the bottom end 50 of the shutter downwardly to cover the exposed terminals 38.

The lever 54, link 78, rod 88 and spring 98 cooperate together to control the automatic opening and closing of the shutter over the terminals. Other means for controlling the position of the shutter is also contemplated by the invention. It is within the skill of those in the art to adjust the length and travel of the link 78 with the appropriate size of the other parts of the control means to provide the degree of rotation required for the shutter 42 to clear the rear face of an inserted control device. In fact, the present invention even contemplates rotating the bottom end 50 of the shutter so that the shutter 42 is again parallel and flush with the rear portion 32 of the framework.

The spring 98 can be positioned in many places along the assembly 40 and still provide the force necessary to return the control means to its original position. For example, one end of the spring 98 can be connected to the cam 86 and the other end of the spring to a hole in the channel side wall 62. Consequently, there would be no need for the retaining wall 102 and crimp 100 in the link to hold the spring 98 therebetween.

Other means of biasedly returning the control means to its original position are also contemplated by the present invention. For example, a torsion rod is a suitable to provide the biased force between the lever 54 and the rod 88.

In another embodiment of the present invention, the housing is eliminated and the various elements of the control means and the support for the shutter 42 is directly attached to the framework 16. Accordingly, the lever 54 and rod 88 are both directly mounted in a rotatable manner to the framework 16 itself. For example, holes are provided at the appropriate position in the side portion 34 of the framework. Although this embodiment does not have the attendant advantages of the self-contained assembly 40 previously described, the particular design of a control center may necessitate this approach.

Preferably, the shutter 42 and the housing 48 is made of an electrically insulating material. Although the shutter 42 does not have contact with the terminals 38 in the preferred embodiment, it is a safety precaution that the shutter 42 not be electrically conductive in case it touches a live terminal. A thermoplastic material is preferred although other plastics are suitable for use with the invention. For the housing 48, it is also suitable to use metal with an insulating coating or paint finish.

The inventive shutter 42 can be made in various colors, although, safety related colors like red and yellow are preferred. Warning labels, symbols, or instructions can be readily attached to the face of the shutter. Such items can be integrally formed along with the shutter.

The present invention is specifically disclosed for use with control centers manufactured by the Square D Company under the catalog designation OmegaPak (registered trademark of the Square D Company) and others. Motor controls like the Model 6 units and the Model 5 units (registered trademarks of the Square D Company) and other power output units are a type of the control devices referred to herein. In particular, the preferred embodiment is used as either an original equipment or aftermarket attachment with the Model 6 units. These control units are used in control centers which have been in the marketplace for years and have been continually updated.

As described herein, the present invention provides a method of safely protecting an exposed terminal mounted in a control center. The control center 10 is provided with the partially enclosed framework 16 and at least one cell like 26 defined in the framework for receiving the control device like 12. The control center 10 has a plurality of terminals 38 extending from the rear portion 32 of the framework in each cell for mating with a corresponding plurality of terminal receivers extending from a rear portion of the control device.

Subsequently, the self-contained shutter assembly 40 is installed for supporting a shutter 42 in a superposed relation over the exposed terminals 38. The shutter assembly 40 also controls the rotation of the shutter 42 to expose the terminal 38 when the control device is inserted in the cell and reversibly pivots the shutter 42 to cover the terminal 38 upon removing the control device from the cell.

As those skilled in the art will appreciate, the inventive shutter assembly can be adapted and configured for usage with a wide variety of control centers. Adapting the shape of the housing and shutter to utilize features of a control center framework to attach the self-contained shutter assembly thereto allows upgrading the safety of control centers already in the marketplace.

It will be further understood that whereas the term control centers is defined to include, but not be limited to, motor control centers and switchgear. Likewise, the term control devices is defined to include motor controls and other types of control units like circuit breakers, switches, fuses, and combinations thereof.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A shutter assembly for covering an exposed electrical terminal located in a control center having at least one cell which receives an electrical control device connecting to the terminal, the assembly comprising:

a shutter having sufficient size to substantially cover the exposed terminal when superposed thereover, the shutter having a pivotal axis at one end, so that the opposite end of the shutter pivots away from the exposed terminal and swings clear of the control device to provide access to the terminal;

means for controlling the rotation of the shutter on the pivotal axis so the control means automatically pivots the shutter to expose the terminal when the control device is inserted in the cell and reversibly pivots the shutter to cover the terminal upon removing the control device from the cell, the control means including a rod being attached along the pivotal axis of the shutter, one end of the rod being affixed to a cam, a lever having one end extending into the area of the cell for engaging the control device upon entering the cell, a link having one end rotatably connecting to the end of the lever opposite the one end engaging the cell, the other end of the link rotatably connecting to the end of the cam opposite the connected to the rod, and means for biasedly returning the control means to the disengaged position so that the shutter covers the terminal after the control device is removed from the cell, the bias means connecting to the control means;

means for supporting the shutter in a superposed relation to the terminal and fastening the control means to the center, the support means includes rotatably mounting the lever to the control center so that the engaging lever end extends into the cell, and rotatably mounting at least one section of the rod to the control center so that the shutter is in superposed relation to the terminal and swings on the pivotal axis to clear the control device to provide access to the terminal.

2. A shutter assembly for covering an exposed electrical terminal located in a control center having at least one cell which receives an electrical control device connecting to the terminal, the assembly comprising:

a shutter having sufficient size to substantially cover the exposed terminal when superposed thereover, the shutter having a pivotal axis at one end, so that the opposite end of the shutter pivots away from the exposed terminal and swings clear of the control device to provide access to the terminal;

means for supporting the shutter in a superposed relation to the terminal with a housing, the housing includes a channel having a bight portion defined by two upstanding side walls, the channel having means for fastening the channel to the control center; and means for controlling the rotation of the shutter on the pivotal axis so the control means automatically pivots the shutter to expose the terminal when the control device is inserted in the cell and reversibly pivots the shutter to cover the terminal upon removing the control device from the cell, the control means including a rod being attached along the pivotal axis of the shutter, one end of the rod affixed to a cam, and rotatably mounting a section of the rod to one of the channel side walls so that the shutter is in superposed relation to the terminal and swings on the pivotal axis to clear the control device to provide access to the terminal, a lever rotatably mounting to the top edge of the channel side wall, the lever having one end extend into the area of the cell for engaging the control unit upon entering the cell, a link having one end rotatably connecting to the end of the lever opposite the one end engaging the cell, the other end of the link rotatably connecting to the end of the cam opposite the end connected to the rod, and means for biasedly returning the control means to the disengaged position so that the shutter covers the terminal after the control device is removed from the cell, the bias means connecting to the control means.

3. The assembly of claim 2 wherein the housing further includes a second channel connected to and extending perpendicularly from the channel side wall inwardly into the area of the cell, the second channel having a bight portion defined by two upstanding side walls, the bight portion having sufficient width to rotatably mount the rod section between the two side walls.

4. The assembly of claim 2 wherein the bias means includes a spring mounting parallel to the length of the link, one end of the spring attaching to the link, the opposite end of the spring adapted for attaching to the channel.

5. The assembly of claim 4 wherein the channel included a retaining wall extending perpendicularly across the bight portion of the channel, the retaining wall having an aperture for extending the link therethrough, the opposite end of the spring abutting the retaining wall.

6. A center for controlling electrical service with at least one control unit, the center comprising:

a partially enclosed framework;

at least one cell defined in the framework for receiving the control device;

a plurality of terminals extending from a rear portion of each cell for mating with a corresponding plurality of terminal receivers extending from a rear portion of the control unit;

a shutter assembly comprising a shutter having sufficient size to substantially cover the exposed terminal when superposed thereover, the shutter having a pivotal axis at one end, so that the opposite end of the shutter pivots away from the exposed terminal and swings clear of the control device to provide access to the terminal;

means for controlling the rotation of the shutter on the pivotal axis so the control means automatically pivots the shutter to expose the terminal when the control device is inserted in the cell and reversibly pivots the shutter to cover the terminal upon removing the control device from the cell, the control means including a rod being attached along the pivotal axis of the shutter, one end of the rod being affixed to a cam, a lever having one end extend into the area of the cell for engaging the control device upon entering the cell, a link having one end rotatably connected to the end of the lever opposite the one end engaging the cell, the other end of the link rotatably connecting to the end of the cam opposite the end connected to the rod, means for biasedly returning the control means to the disengaged position so that the shutter covers the terminal after the control device is removed from the cell, the bias means connecting to the control means;

means for supporting the shutter in a superposed relation to the terminal and fastening the control means to the center, the support means includes rotatably mounting the lever to the framework so that the engaging lever end extends into the cell, and rotatably mounting at least one section of the rod to the framework so that the shutter is in superposed relation to the terminal and swings on the pivotal axis to clear the control device to provide access to the terminal.

7. A center for controlling electrical service with at least one control unit, the center comprising:

partially enclosed framework;

at least one defined in the framework for receiving the control device;

a plurality of terminals extending from a rear portion of each cell for mating with a corresponding plurality of terminal receivers extending from a rear portion of the control unit;

a shutter assembly comprising:

a shutter having sufficient size to substantially cover the exposed terminal when superposed thereover, the shutter having a pivotal axis at one end, so that the opposite end of the shutter pivots away from the exposed terminal and swings clear of the control device to provide access to the terminal;

means for supporting the shutter in a superposed relation to the terminal with a housing, the housing includes a channel having a bight portion defined by two upstanding side walls, the channel having means for fastening the channel to the framework; and means for controlling the rotation of the shutter on the pivotal axis so the control means automatically pivots the shutter to expose the terminal when the control device is inserted in the cell and reversibly pivots the shutter to cover the terminal upon removing the control device from the cell, the control means including a rod being attached along the pivotal axis of the shutter, one end of the rod being affixed to a cam, and rotatably mounting a section of the rod to one of the channel side walls so that the shutter is in superposed relation to the terminal and swings on the pivotal axis to clear the control device to provide access to the terminal, a lever rotatably mounting to the top edge of the channel side wall, the lever having one end extend into the area of the cell for engaging the control unit upon entering the cell, a link having one end rotatably connecting to the end of the lever opposite the one end engaging the cell, the other end of the link rotatably connecting to the end of the cam opposite the connected to the rod, and means for biasedly returning the control means to the disengaged position so that the shutter covers the terminal after the control device is removed from the cell, the bias means connecting to the control means.

8. The center of claim 7 wherein the bias means includes a spring mounting parallel to the length of the link, one end of the spring attaching to the link, the opposite end of the spring adapted for attaching to the channel.

9. The center of claim 8 wherein the channel included a retaining wall extending perpendicularly across the bight portion of the channel, the retaining wall having an aperture for extending the link therethrough, the opposite end of the spring abutting the retaining wall.

10. The center of claim 7 wherein the housing further includes a second channel connecting to and extending perpendicularly from the channel side wall inwardly into the area of the cell, the second channel having a bight portion defined by two upstanding side walls, the bight portion having sufficient width to rotatably mount the rod section between the two side walls.

* * * * *